(12) United States Patent
Lin et al.

(10) Patent No.: US 8,711,940 B2
(45) Date of Patent: Apr. 29, 2014

(54) METHOD AND APPARATUS OF MOTION VECTOR PREDICTION WITH EXTENDED MOTION VECTOR PREDICTOR

(75) Inventors: Jian-Liang Lin, Yilan (TW); Yu-Pao Tsai, Kaohsiung (TW); Yu-Wen Huang, Taipei (TW); Shaw-Min Lei, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 138 days.

(21) Appl. No.: 13/089,233

(22) Filed: Apr. 18, 2011

(65) Prior Publication Data

US 2012/0134415 A1 May 31, 2012

Related U.S. Application Data

(60) Provisional application No. 61/417,798, filed on Nov. 29, 2010, provisional application No. 61/431,454, filed on Jan. 11, 2011.

(51) Int. Cl.
*H04N 11/02* (2006.01)

(52) U.S. Cl.
USPC .................................... 375/240.16

(58) Field of Classification Search
USPC .............................. 375/240.01–29
See application file for complete search history.

(56) References Cited

U.S. PATENT DOCUMENTS

| | | | | |
|---|---|---|---|---|
| 2004/0086047 A1* | 5/2004 | Kondo et al. | ............ | 375/240.16 |
| 2005/0129129 A1* | 6/2005 | Winger et al. | ............ | 375/240.24 |
| 2007/0025444 A1* | 2/2007 | Okada et al. | ............ | 375/240.16 |
| 2008/0031341 A1 | 2/2008 | Jeon | | |
| 2010/0215101 A1 | 8/2010 | Jeon | | |

FOREIGN PATENT DOCUMENTS

| | | |
|---|---|---|
| JP | 2008283490 A | 11/2008 |
| JP | 201016454 A | 1/2010 |
| JP | 2010516158 A | 5/2010 |
| WO | 2008084997 A1 | 7/2008 |
| WO | 2010001045 A1 | 1/2010 |

OTHER PUBLICATIONS

McCann et al., "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, Apr. 15-23, 2010.

* cited by examiner

*Primary Examiner* — Nhon Diep
*Assistant Examiner* — Leron Beck
(74) *Attorney, Agent, or Firm* — Blairtech Solution LLC

(57) ABSTRACT

A method and apparatus for determining a motion vector predictor (MVP) or a MVP candidate based on a MVP set are disclosed. In video coding systems, the spatial and temporal redundancy is exploited using spatial and temporal prediction to reduce the video data to be transmitted or stored. Motion vector prediction has been used to further conserve the bitrate associated with motion vector coding. Motion vector prediction technique being developed for the current high efficiency video coding (HEVC) only uses a MVP candidate set including spatial MVP candidates and a temporal candidate corresponding to the co-located block. In the current disclosure, the spatial and temporal motion vector predictor set is extended to include at least one spatially neighboring block associated with list 0 reference pictures and list 1 reference pictures, and co-located block and its neighboring block associated with list 0 reference pictures and list 1 reference pictures.

24 Claims, 7 Drawing Sheets

|  |  |  |  |  |  |
|---|---|---|---|---|---|
| $T_{-1,-1}$ | $T_{-1,0}$ | ••• ••• | $T_{-1,n}$ | $F_{-1}$ |
| $T_{0,-1}$ | $T_{0,0}$ | ••• ••• | $T_{0,n}$ | $F_0$ |
|  | • • | • • • | • • | • • |
|  | • • | • • | • • | • • |
| $T_{m,-1}$ | $T_{m,0}$ | ••• ••• | $T_{m,n}$ | $F_m$ |
| $G_{-1}$ | $G_0$ | ••• ••• | $G_n$ | $H$ |

|  |  |  |  |  |  |
|---|---|---|---|---|---|
| $e$ | $a_0$ | ••• ••• | $a_n$ | $c$ |
| $b_0$ |  | ••• ••• |  |  |
| • • | • • | • • • | • • | • • |
| • • | • • | • • | • • | • • |
| $b_m$ |  | ••• ••• | $T_{m,n}$ |  |
| $d$ |  | ••• ••• |  |  |

| e | $a_0$ | ••••• | $a_n$ | c |
|---|---|---|---|---|
| $b_0$ | $T_{0,0}$ | | $T_{0,n}$ | |
| ⋮ | | $T_{i,j}$ | | 210 |
| ⋮ | | | | |
| $b_m$ | $T_{m,0}$ | ••••• | $T_{m,n}$ | |
| d | | | | |

*Fig. 5*

| e | $a_0$ | ••••• | $a_n$ | c |
|---|---|---|---|---|
| $b_0$ | $T_{0,0}$ | ••••• | $T_{0,n}$ | |
| ⋮ | | | | 210 |
| ⋮ | | | | |
| $b_m$ | $T_{m,0}$ | ••••• | $T_{m,n}$ | |
| d | | | | |

METHOD AND APPARATUS OF MOTION VECTOR PREDICTION WITH EXTENDED MOTION VECTOR PREDICTOR

CROSS REFERENCE TO RELATED APPLICATIONS

The present invention claims priority to U.S. Provisional Patent Application Ser. No. 61/417,798, filed Nov. 29, 2010, entitled "New Motion Vector Predictor Set" and U.S. Provisional Patent Application Ser. No. 61/431,454, filed Jan. 11, 2011, entitled "Improved Advanced Motion Vector Prediction". The present invention is also related to U.S. patent application Ser. No. 13/039,555, entitled "Method and Apparatus of Temporal Motion Vector Prediction", filed on Mar. 3, 2011 and U.S. patent application Ser. No. 13/047,600, entitled "Method and Apparatus of Spatial Motion Vector Prediction", filed on Mar. 14, 2011. The U.S. Provisional Patent Applications and US Patent Applications are hereby incorporated by reference in their entireties.

FIELD OF THE INVENTION

The present invention relates to video coding. In particular, the present invention relates to coding techniques associated with motion vector prediction.

BACKGROUND

In video coding systems, spatial and temporal redundancy is exploited using spatial and temporal prediction to reduce the information to be transmitted for the underlying video data. The spatial and temporal prediction utilizes decoded pixels from the same frame/picture and reference pictures respectively to form prediction for current pixels to be coded. In order to effectively exploit the temporal redundancy in video sequence, Motion Compensated Prediction (MCP) is widely used in the field. Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. The transmission of motion vectors may require a noticeable portion of the overall bandwidth, particularly in low-bitrate applications or in systems where motion vectors are associated with smaller blocks or higher motion accuracy. To reduce the bitrate associated with motion vector, a technique called motion vector prediction has been used in the field of video coding in recent years. When motion vector prediction is used, the difference between the current motion vector and the motion vector predictor is transmitted instead of the current motion vector. A well designed motion vector prediction scheme may substantially improve the compression efficiency by causing smaller motion residues, i.e. smaller differences between current motion vectors and motion vector predictors.

In the High Efficiency Video Coding (HEVC) standard being developed, a technique named Advanced Motion Vector Prediction (AMVP) is disclosed. The AMVP technique uses explicit predictor signaling to indicate the motion vector predictor (MVP) candidate or MVP candidate set selected. The MVP candidate set includes spatial MVP candidates as well as temporal MVP candidates. The spatial MVP candidates according to AMVP are derived from motion vectors associated with neighboring blocks on the left side and the top side of a current block. The temporal MVP candidate is derived based on the motion vector of the co-located block. It is very desirable to further improve the efficiency of motion vector prediction by extending the MVP set to cover more blocks. Furthermore, it is desirable to derive motion vector predictor based on decoded information at the decoder side so that no additional side information has to be transmitted. Alternatively, side information can be transmitted explicitly in the bitstream to inform the decoder regarding the motion vector predictor selected.

BRIEF SUMMARY OF THE INVENTION

A method and apparatus for deriving motion vector predictor or motion vector predictor candidate for a current prediction unit (PU) in a picture are disclosed. In one embodiment according to the present invention, the method and apparatus for deriving motion vector predictor or motion vector predictor candidate for a current PU in a picture comprises steps of receiving motion vectors associated with at least a spatially neighboring block of the current PU, at least a co-located block of the current PU, and at least a neighboring blocks of a co-located PU; and determining a motion vector predictor (MVP) or a MVP candidate based on a MVP set, wherein the MVP set comprises motion vector candidates derived from the motion vectors associated with the spatially neighboring block, the co-located block and its neighboring block. The motion vectors associated with the spatially neighboring block, the co-located block and its neighboring block can be obtained from a previously coded frame or picture. Furthermore, each of the motion vectors associated with the spatially neighboring block, the co-located block and its neighboring block can be derived from one of multiple reference pictures and one of two lists with a scaling factor. The MVP set comprises a motion vector candidate derived as a first available motion vector or according to an order from a candidate group, wherein the candidate group consists of at least two of the motion vectors associated with the spatially neighboring blocks, the co-located blocks, or the neighboring blocks of the co-located PU. The information related to the MVP or the MVP candidate can be derived from decoded video data, or alternatively incorporated in sequence header, picture header or slice header.

BRIEF DESCRIPTION OF THE DRAWINGS

FIG. 3 illustrates extending the co-located block to include neighboring blocks of the co-located block for deriving motion vector prediction.

FIG. 4 illustrates one example of extended motion vector predictor set according to one embodiment of the present invention, where the extended motion vector predictor set includes $T_{m,n}$ as the temporal MVP candidate.

FIG. 5 illustrates one example of extended motion vector predictor set according to one embodiment of the present invention, where the extended motion vector predictor set includes $T_{i,j}$ as the temporal MVP candidate, where $i \neq 0$ and $j \neq 0$.

FIG. 6 illustrates one example of extended motion vector predictor set according to one embodiment of the present invention, where the extended motion vector predictor set includes T' as the temporal MVP candidate, where T' is the first available MVP candidate in group $\{T_{0,0}, \ldots, T_{m,n}\}$.

FIG. 7 illustrates one example of extended motion vector predictor set according to one embodiment of the present invention, where the extended motion vector predictor set includes temporal MVP candidates ($T_{0,0}$, $F_0$, and $G_0$).

FIG. 8 illustrates one example of extended motion vector predictor set according to one embodiment of the present invention, where the extended motion vector predictor set includes temporal MVP candidates (T', F', and G') corresponding to the first available MVs of groups $\{T_{0,0}, \ldots, T_{m,n}\}$, $\{F_0, \ldots, F_m\}$, and $\{G_0, \ldots, G_n\}$ respectively.

FIG. 9 illustrates one example of extended motion vector predictor set according to one embodiment of the present invention, where the extended motion vector predictor set includes temporal MVP candidates (T', F', G' and H), where (T', F', and G') correspond to the first available MVs of groups $\{T_{0,0}, \ldots, T_{m,n}\}$, $\{F_0, \ldots, F_m\}$, and $\{G_0, \ldots, G_n\}$ respectively.

FIG. 10 illustrates one example of extended motion vector predictor set according to one embodiment of the present invention, where the extended motion vector predictor set includes temporal MVP candidates ($T_{0,0}$, $T_{m,n}$, $F_0$, $G_0$, and H).

FIG. 11 illustrates one example of extended motion vector predictor set according to one embodiment of the present invention, where the extended motion vector predictor set includes temporal MVP candidates ($T_{0,0}$, $F_0$, $G_0$, and H).

FIG. 12 illustrates an alternative extended motion vector predictor set according to one embodiment of the present invention, where the extended motion vector predictor set includes the same temporal MVP candidates as those of FIG. 11 and the spatial MVP candidate c' is replaced with (c, d and e).

FIG. 13 illustrates one example of extended motion vector predictor set according to one embodiment of the present invention, where the extended motion vector predictor set includes temporal MVP candidates ($T_{m,n}$, $F_0$, $G_0$, and H).

FIG. 14 illustrates one example of extended motion vector predictor set according to one embodiment of the present invention, where the extended motion vector predictor set includes temporal MVP candidates ($T_{0,0}$, $T_{0,n}$, $T_{m,0}$, $T_{m,n}$, $F_0$, $G_0$, and H).

DETAILED DESCRIPTION OF THE INVENTION

Figures 1, 2:
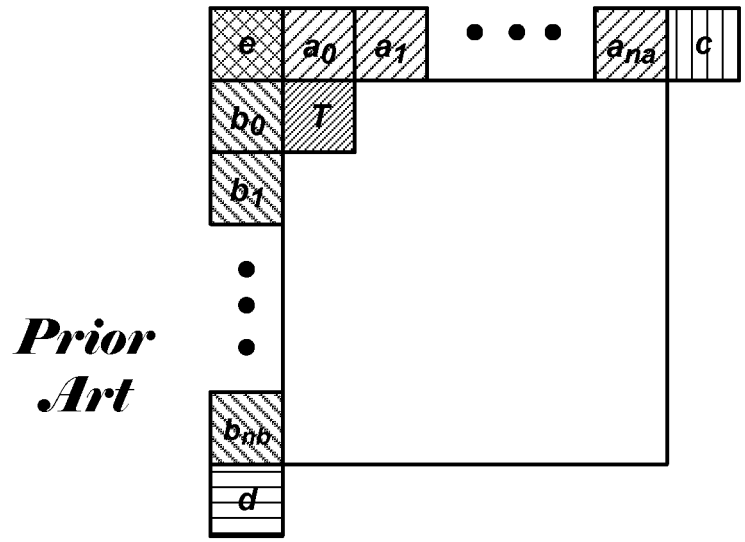
FIG. 1 illustrates neighboring and co-located block configuration of spatial and temporal motion vector prediction based on motion vectors of the neighboring blocks and the co-located block in the Advanced Motion Vector Prediction (AMVP) being considered for the HEVC standard.
FIG. 2 illustrates extended neighboring and co-located block configuration for deriving spatial and temporal motion vector prediction based on motion vectors of neighboring blocks, co-located block and neighboring blocks of the co-located block.

In video coding systems, the spatial and temporal redundancy is exploited using spatial and temporal prediction to reduce the video bitstream to be transmitted or stored. The spatial prediction utilizes decoded pixels from the same picture to form prediction for current pixels to be coded. The spatial prediction is often operated on a block by block basis, such as 16×16 or 4×4 block for luminance signal in H.264/AVC Intra coding. In video sequences, neighboring pictures often bear great similarities, and simply using picture differences can effectively reduce the transmitted information associated with static background areas. Nevertheless, moving objects in the video sequence may result in substantial residues and will require higher bitrate to code the residues. Consequently, Motion Compensated Prediction (MCP) is often used to exploit temporal correlation in video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to list 0 prediction and list 1 prediction respectively, where both list 0 and list 1 can contain multiple reference pictures prior to or later than the current picture in the display order. For list 0, reference pictures prior to the current picture have lower reference picture indices than those later than the current picture. For list 1, reference pictures later than the current picture have lower reference picture indices than those prior to the current picture. The first reference picture having index 0 is called co-located picture. When a block in a list 0 or list 1 co-located picture has the same block location as the current block in the current picture, it is called a list 0 or list 1 co-located block, or called a co-located block in list 0 or list 1. The unit used for motion estimation mode in earlier video standards such as MPEG-1, MPEG-2 and MPEG-4 is primarily based on macroblock. For H.264/AVC, the 16×16 macroblock can be segmented into 16×16, 16×8, 8×16 and 8×8 blocks for motion estimation. Furthermore, the 8×8 block can be segmented into 8×8, 8×4, 4×8 and 4×4 blocks for motion estimation. For the High Efficiency Video Coding (HEVC) standard under development, the unit for motion estimation/compensation mode is called Prediction Unit (PU), where the PU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction and the bidirectional prediction in addition to the list 0 prediction.

In video coding systems, motion vectors and coded residues along with other related information are transmitted to a decoder for reconstructing the video at the decoder side. Furthermore, in a system with flexible reference picture structure, the information associated with the selected reference pictures may also have to be transmitted. The transmission of motion vectors may require a noticeable portion of the overall bandwidth, particularly in low-bitrate applications or in systems where motion vectors are associated with smaller blocks or higher motion accuracy. To further reduce the bitrate associated with motion vector, a technique called Motion Vector Prediction (MVP) has been used in the field of video coding in recent years. In this disclosure, MVP may also refer to Motion Vector Predictor and the abbreviation is used when there is no ambiguity. The MVP technique exploits the statistic redundancy among neighboring motion vectors spatially and temporally. When MVP is used, a predictor for the current motion vector is chosen and the motion vector residue, i.e., the difference between the motion vector and the predictor, is transmitted. The MVP scheme can be applied in a closed-loop arrangement where the predictor is derived at the decoder based on decoded information and no additional side information has to be transmitted. Alternatively, side information can be transmitted explicitly in the bitstream to inform the decoder regarding the motion vector predictor selected.

In the H.264/AVC standard, there is also a SKIP mode in additional to the conventional Intra and Inter modes for macroblocks in a P slice. The SKIP is a very effective method to achieve large compression since there is no quantized error signal, no motion vector, nor reference index parameter to be transmitted. The only information required for the 16×16 macroblock in the SKIP mode is a signal to indicate the SKIP mode being used and therefore substantial bitrate reduction is achieved. The motion vector used for reconstructing the SKIP macroblock is similar to the motion vector predictor for a macroblock. A good MVP scheme may result in more zero motion vector residues and zero quantized prediction errors. Consequently, a good MVP scheme may increase the number of SKIP-coded blocks and improve the coding efficiency.

In the H.264/AVC standard, four different types of inter-prediction are supported for B slices including list 0, list 1, bi-predictive, and DIRECT prediction, where list 0 and list 1 refer to prediction using reference picture group 0 and group 1 respectively. For the bi-predictive mode, the prediction signal is formed by a weighted average of motion-compensated list 0 and list 1 prediction signals. The DIRECT prediction mode is inferred from previously transmitted syntax elements and can be either list 0 or list 1 prediction or bi-predictive. Therefore, there is no need to transmit information for motion vector in the DIRECT mode. In the case that no quantized error signal is transmitted, the DIRECT macroblock mode is referred to as B SKIP mode and the block can be efficiently coded. Again, a good MVP scheme may result in more zero motion vector residues and smaller prediction errors. Consequently, a good MVP scheme may increase the number of DIRECT-coded blocks and improve the coding efficiency.

In U.S. patent application Ser. No. 13/047,600, entitled "Method and Apparatus of Spatial Motion Vector Prediction", filed on Mar. 14, 2011 by the same inventors, a method for deriving motion vector predictor candidate for a current block based on motion vectors from a spatially neighboring block are disclosed. In U.S. patent application Ser. No. 13/047,600, the motion vector for a current block is predicted by motion vectors of the spatially neighboring blocks associated with list 0 reference pictures and list 1 reference pictures. Furthermore, the motion vectors are considered as candidates of predictor for the current block and the candidates are arranged in a priority order. In U.S. patent application Ser. No. 13/039,555, entitled "Method and Apparatus of Temporal Motion Vector Prediction", filed on Mar. 3, 2011 by the same inventors, a system and method for deriving motion vector predictor based on motion vectors associated with a temporally co-located block are disclosed. In U.S. patent application Ser. No. 13/039,555, the motion vector for a current block is predicted by the motion vectors of temporal blocks in the past and/or the future reference pictures effectively. Furthermore, the temporal motion vectors are considered as candidates of predictor for the current block and the candidates are arranged in a priority order. In the current disclosure, the spatial and temporal motion vector predictor set is extended to include spatially neighboring blocks associated with list 0 reference pictures and list 1 reference pictures, and temporally co-located block and its neighboring blocks associated with list 0 reference pictures and list 1 reference pictures.

In HEVC development, a technique named Advanced Motion Vector Prediction (AMVP) is proposed by McCann et al., in "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, 15-23 Apr. 2010. The AMVP technique uses explicit predictor signaling to indicate the selected MVP candidate in the MVP candidate set. The MVP candidate set includes spatial MVP candidates as well as temporal candidates, where the spatial MVP candidates includes three candidates a', b' and c' as shown in FIG. 1. The candidate a' is the first available motion vector from the group of blocks $\{a_0, a_1, \ldots, a_{na}\}$ on the top side of the current block as shown in FIG. 1, where na is the number of blocks in this group. The candidate b' is the first available motion vector from the group of blocks $\{b_0, b_1, \ldots, b_{nb}\}$ on the left side of the current block as shown in FIG. 1, where nb is the number of blocks in this group. The candidate c' is the first available motion vector from the group of blocks $\{c, d, e\}$ on the neighboring corners of the current PU as shown in FIG. 1. The MVP candidate set proposed by McCann et al. is defined as $\{median(a', b', c'), a', b', c', temporal MVP candidate\}$. The AMVP technique by McCann et al. only considers the motion vector as an available spatial MVP candidate only if the motion vector is associated with the same reference list and the same reference picture index as the current block. For spatial MVP candidate, if the MV with the same reference list and the same reference picture index is not available from the neighboring block, the AMVP technique looks for available motion vector from the next neighboring block in the group. The temporal MVP candidate according to McCann et al. is the co-located MV T as shown in FIG. 1. The temporal motion predictor is given by the nearest reference frame and can be scaled according to a temporal distance. The scaling factor is based on the ratio of the temporal distance between the current picture and the given reference picture for the current block to the temporal distance between the nearest reference picture and the reference picture associated with the MV of the co-located block. The reference picture associated with the MV of the co-located block may not belong to the list of reference pictures of the current block. In this case, the temporal MVP candidate is not available for the current block according to McCann et al. While the scheme disclosed in U.S. patent application Ser. No. 13/039,555 and Ser. No. 13/047,600, provides various examples to improve the availability of the MVP candidate associated with the co-located block and neighboring block, it is very desirable to extend the MVP set to cover more temporal blocks and/or more spatially neighboring blocks associated with list 0 reference pictures and list 1 reference pictures. The scheme disclosed in U.S. patent application Ser. No. 13/039,555 can be applied to each block of the MVP set to improve the availability of the MVP candidate associated with temporal blocks.

Accordingly, an extended motion vector predictor (MVP) set is disclosed where the MVP set includes spatial MVP candidates and temporal MVP candidates as shown in FIG. 2. FIG. 2 illustrates an example of MVP set including spatial MVP candidates and temporal MVP candidates, where the spatial MVP candidates are associated with the spatially neighboring block of FIG. 1 and the temporal MVP candidates are associated with the blocks $\{T_{0,0}, \ldots, T_{m,n}\}$ of co-located PU 210 as well as its neighboring blocks $\{F_0, \ldots, F_m\}$, $\{G_0, \ldots, G_n\}$, and H of PU 210. For convenience, n and m are used in FIG. 2 to replace na and nb respectively of FIG. 1. While one column and one row of blocks extending to the right side and bottom side from PU 210 are illustrated in FIG. 2 as an example, more blocks in the right and bottom area of PU 210 may be used as well. In a conventional approach, only the co-located block at the top left corner of the PU 210 is considered for temporal MVP candidate. In this example of FIG. 2, the temporal MVP candidates are derived from at least one co-located block and neighboring blocks of the co-located blocks. The motion vectors of the co-located block and its neighboring blocks are obtained from a previously coded frame or picture. The motion vector of each spatial or temporal candidate can be derived from one of multiple reference pictures and one of the two lists with a scaling factor. The motion vector predictor selection can be signaled explicitly to a decoder or alternatively it can be implicitly derived from decoded picture/frame. The U.S. patent application Ser. Nos. 13/039,555 and 13/047,600 disclose a method of deriving motion vector of each spatial or temporal candidate from one of multiple reference pictures and one of the two lists with a scaling factor.

While FIG. 2 shows that the temporal candidate is associated with blocks corresponding to a co-located PU and surrounding blocks, more blocks around the co-located PU may be included. FIG. 3 illustrates an example of further extending the temporal candidates to include neighboring blocks on the left side and top side of the co-located PU for deriving motion vector predictor, where the extended temporal blocks include $\{T_{-1,-1}, \ldots, T_{-1,n}\}$, $\{T_{0,-1}, \ldots, T_{m,-1}\}$, $G_{-1}$ and $F_{-1}$ on the left side and top side of PU 210. While one column and one row of blocks extending to the left side and top side from PU 210 are illustrated in FIG. 3 as an example, more blocks in the top side and/or left side of PU 210 may be used as well. Again, the motion vector of each temporal candidate can be derived from one of multiple reference pictures and one of the two lists with a scaling factor.

FIG. 2 and FIG. 3 illustrate examples of extended MVP set. Elements or combinations of elements from the MVP set can be selected to form the MVP candidate set. The extended MVP set covers more temporal blocks and/or spatially neighboring blocks. Therefore, the extended MVP set is able to form a better MVP candidate set leading to smaller motion vector residues for more efficient compression. In the following paragraphs, various examples of MVP candidate formation are illustrated according to the present invention. FIG. 4 illustrates an example of MVP candidate set $\{\text{median}(a\ b', c'), a', b', c', \text{temporal MVP candidate } (T_{m,n})\}$. The candidate a' is the first available motion vector from the group of blocks $\{a_0, a_1, \ldots, a_n\}$ on the top side of the current block as shown in FIG. 4, where n is the number of blocks in this group. The candidate b' is the first available motion vector from the group of blocks $\{b_0, b_1, \ldots, b_m\}$ on the left side of the current block as shown in FIG. 4, where m is the number of blocks in this group. The candidate c' is the first available motion vector from the group of blocks $\{c, d, e\}$ on the neighboring corners of the current PU as shown in FIG. 4. Only one temporal MV, $T_{m,n}$, within PU 210 is used as the temporal MVP candidate. As mentioned before, the motion vector of each spatial or temporal candidate can be derived from one of multiple reference pictures and one of the two lists with a scaling factor. Also the selected MV predictor can be signaled explicitly to a decoder or alternatively it can be implicitly derived from decoded picture/frame. While the MV, $T_{m,n}$ at the lower-right corner of PU 210 is used as the temporal MVP candidate in the example of FIG. 4, any MV, $T_{i,j}$, where $i \neq 0$ and $j \neq 0$, within PU 210 can be used as the temporal MVP candidate as shown in FIG. 5. For example, the MV, $T_{i,j}$, where $i=(m-1)/2$ and $j=(n-1)/2$ (i.e., the temporal motion vector derived from the motion vector associated with a co-located block corresponding to an upper-left block of a central point of the current PU) is used as the temporal MVP candidate. In another example, the temporal motion vector candidate is derived from the motion vector associated with a co-located block corresponding to a lower-right block of the central point of the current PU. In yet another example, the temporal motion vector candidate can be derived from the motion vector associated with a co-located block corresponding to an upper-left block of a lower-right neighboring block of the current PU.

In another example, the first available MVP candidate T' in group $\{T_{0,0}, \ldots, T_{m,n}\}$ can be used as the temporal MVP candidate as shown in FIG. 6. The group $\{T_{0,0}, \ldots, T_{m,n}\}$ can be arranged in a zig-zag order from $T_{0,0}$ to $T_{m,n}$. Other orderings such as row-by-row or column-by-column may also be used.

Figures 7, 8:
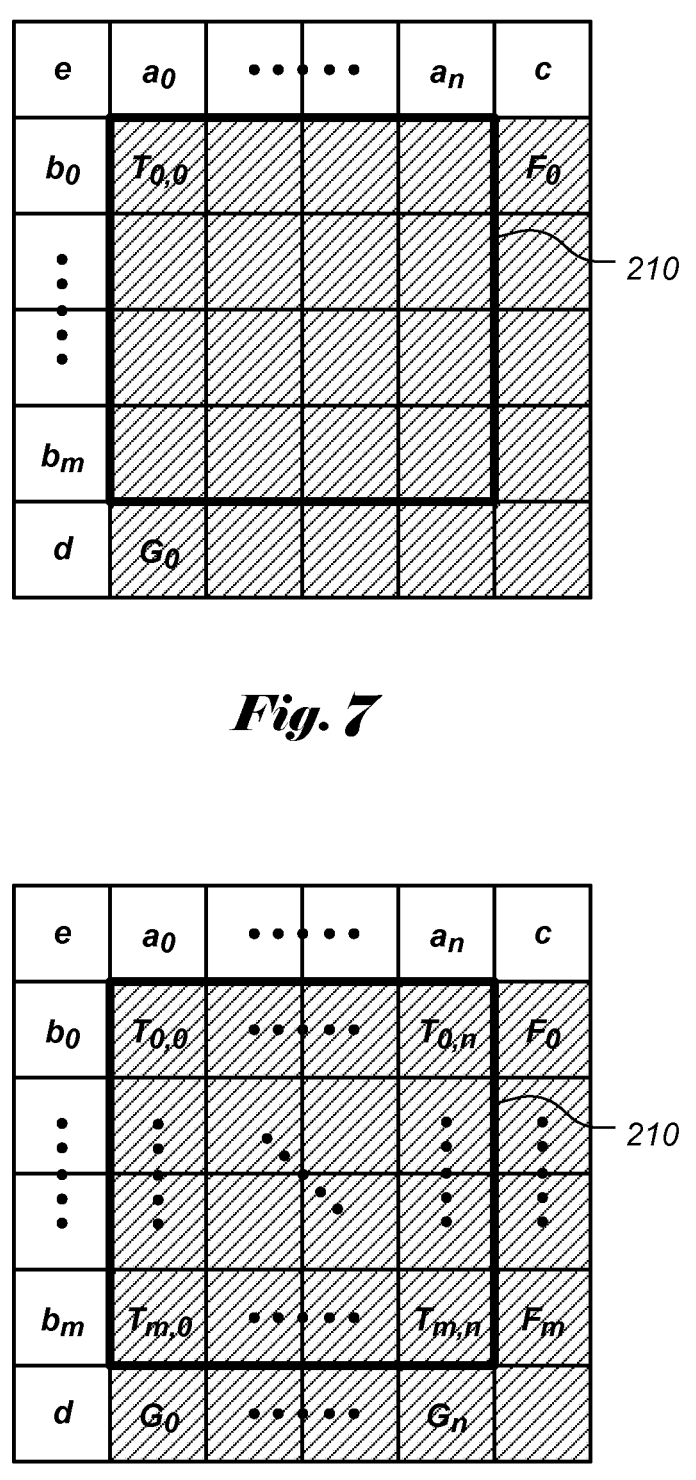

While a single co-located block is used as the temporal MVP candidate, multiple blocks may also be used as MVP candidates. For example, the extended motion vector predictor set includes temporal MVP candidates ($T_{0,0}$, $F_0$, and $G_0$) as shown in FIG. 7. In another example shown in FIG. 8, the extended motion vector predictor set includes temporal MVP candidates (T', F', and G') corresponding to the first available MVs of groups $\{T_{0,0}, \ldots, T_{m,n}\}$, $\{F_0, \ldots, F_m\}$, and $\{G_0, \ldots, G_n\}$ respectively. Again, the group $\{T_{0,0}, \ldots, T_{m,n}\}$ can be arranged in a zig-zag order, row-by-row, or column-by-column from $T_{0,0}$ to $T_{m,n}$. In yet another example shown in FIG. 9, the extended motion vector predictor set includes temporal MVP candidates (T', F', G', and H), where (T', F', and G') correspond to the first available MVs of groups $\{T_{0,0}, \ldots, T_{m,n}\}$, $\{F_0, \ldots, F_m\}$, and $\{G_0, \ldots, G_n\}$ respectively.

Figures 9, 10:
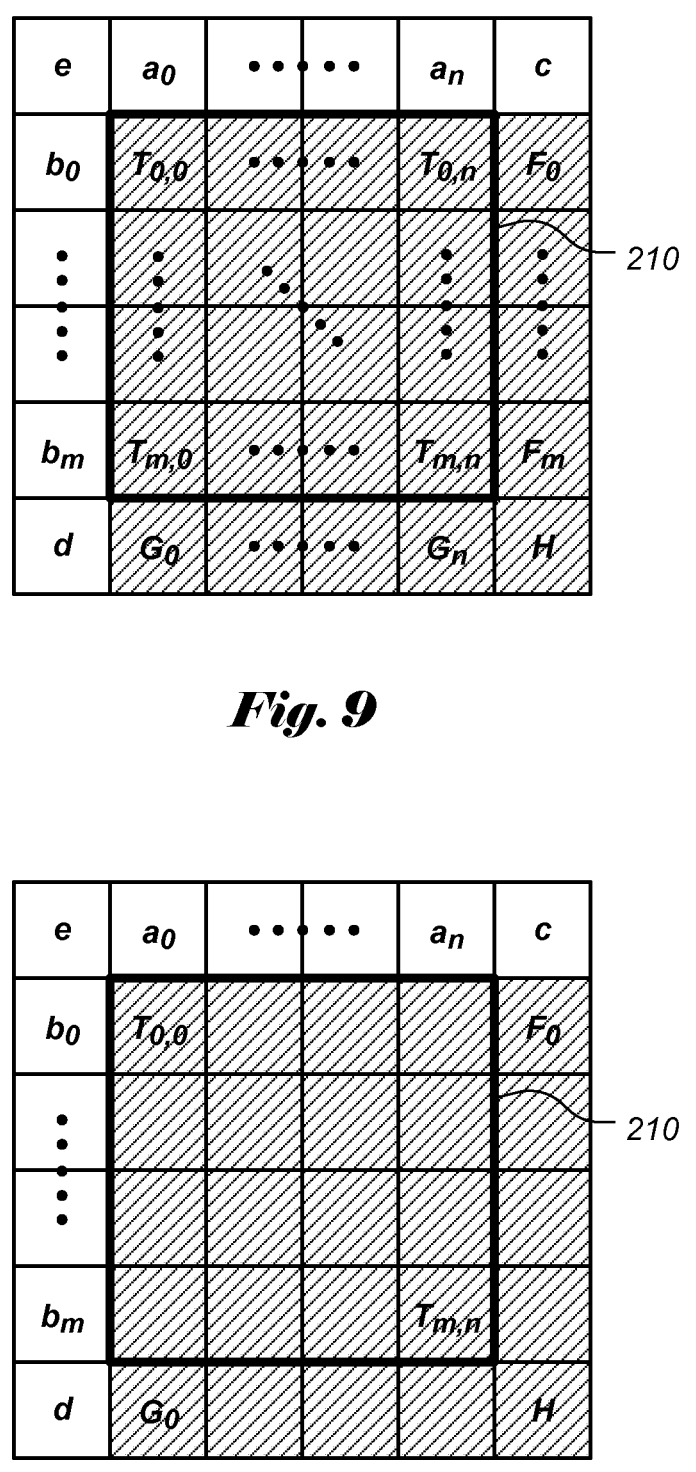
Figures 11, 12:
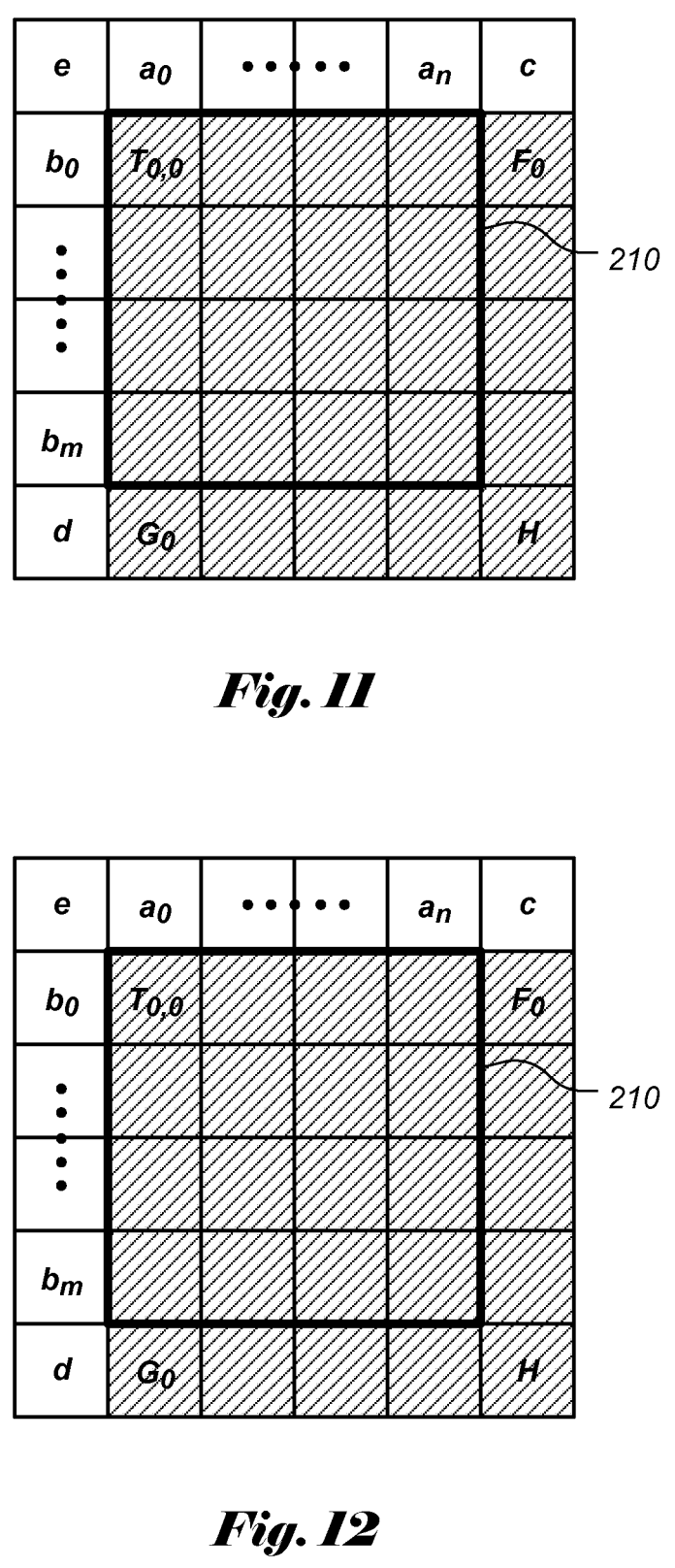
Figures 13, 14:
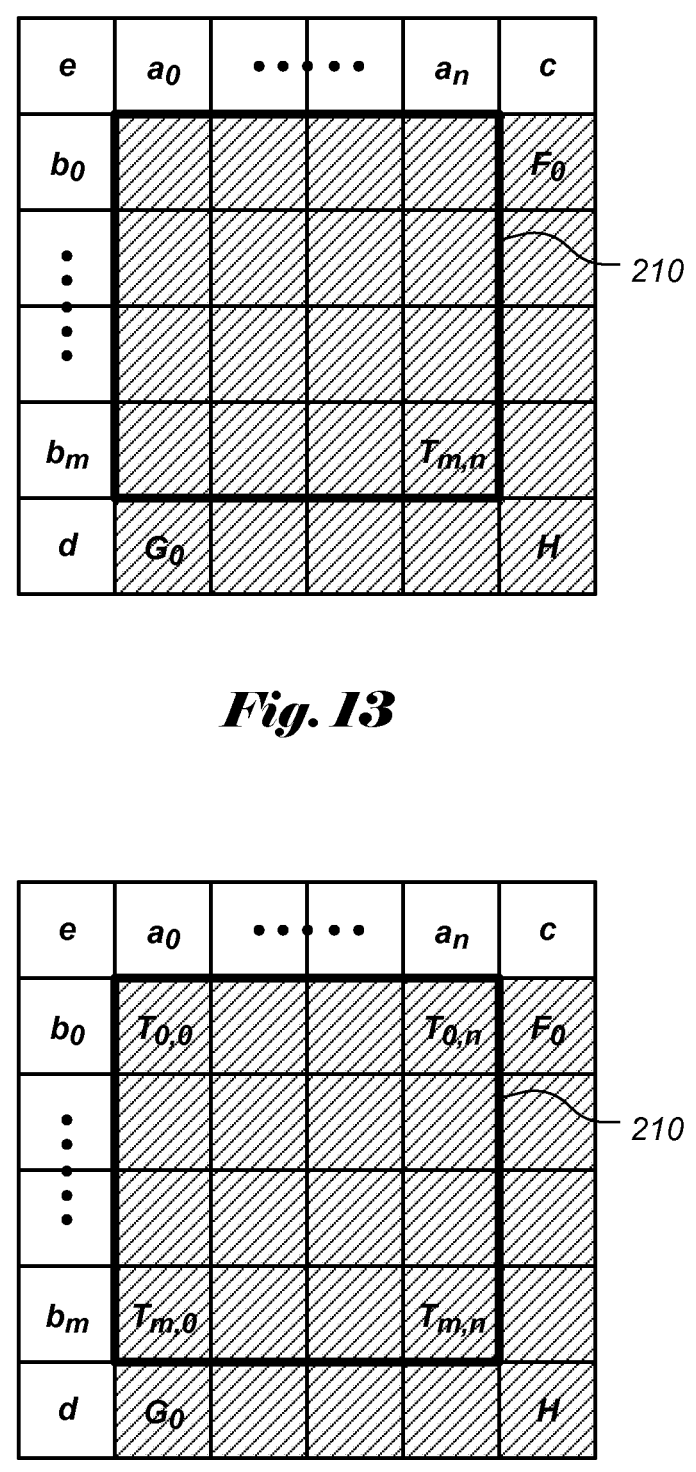

The temporal MVP candidates may include blocks within PU 210 as well as blocks outside PU 210. For example, the extended motion vector predictor set may include temporal MVP candidates ($T_{0,0}$, $T_{m,n}$, $F_0$, $G_0$, and H) as shown in FIG. 10 or temporal MVP candidates ($T_{0,0}$, $F_0$, $G_0$, and H) as shown in FIG. 11. All the examples illustrated above have used (median(a', b', c'), a', b', c') as the spatial MVP candidates. Nevertheless, other neighboring blocks or combination of neighboring blocks may be used as well. For example, the spatial MVP candidates of FIG. 11 can be replaced by (median(a', b, c'), a', b', c, d, and e) as shown in FIG. 12. In another example of temporal MVP candidate formation, the extended motion vector predictor set includes temporal MVP candidates ($T_{m,n}$, $F_0$, $G_0$, and H) as shown in FIG. 13. When it is desired, more blocks may be included as in temporal MVP candidates. For example, the extended motion vector predictor set includes temporal MVP candidates ($T_{0,0}$, $T_{0,n}$, $T_{m,0}$, $T_{m,n}$, $F_0$, $G_0$, and H) as shown in FIG. 14.

Various examples of selecting motion vector predictor candidates to form a MVP candidate set have been illustrated above. These examples are used to illustrate selecting spatial/temporal MVP candidates from an extended motion vector predictor set. While extensive examples have been illustrated, these examples by no means represent exhaustive illustration of possible combinations of motion vector predictor candidates. A skilled person in the field may choose different blocks for the motion vector predictor candidates to practice the present invention. Furthermore, when implicit/explicit MV predictor signaling is used, the order of motion vector prediction among the candidates can be determined according to a pre-defined priority order. However, the priority order of the candidates can also be performed according to an adaptive scheme. The scheme of adaptive priority ordering can be based on the statistic of the reconstructed motion vectors of previous blocks, the partition type of current block, the correlation of the motion vectors, the directions of motion vector, and the distance of the motion vectors. Also, the adaptive scheme may also be based on a combination of two or more of the factors mentioned above.

It is noted that the present invention can be applied to not only INTER mode but also SKIP, DIRECT, and MERGE modes. In the INTER mode, given a current list, a motion vector predictor is used to predict the motion vector of a PU, and a motion vector residue is transmitted. The current invention can be applied for deriving the motion vector predictor when the motion vector competition scheme is not used or for deriving the motion vector predictor candidate when the motion vector competition scheme is used. As for the SKIP, DIRECT, and MERGE, they can be regarded as special cases of the INTER mode where the motion vector residue is not transmitted and always inferred as zero. In these cases, the current invention can be applied for deriving the motion vector when the motion vector competition scheme is not used or for deriving the motion vector candidate when the motion vector competition scheme is used.

Embodiment of motion vector prediction according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deriving motion vector predictor or motion vector predictor candidate for encoding or decoding a motion vector of a current PU (prediction unit) in a picture, the method comprising:
  receiving a current motion vector or a coded motion vector of the current PU;
  receiving motion vectors associated with at least one spatially neighboring block of the current PU and at least one neighboring block of a co-located PU of the current PU, wherein said at least one neighboring block of the co-located PU is selected from a group consisting of one or more right-neighboring blocks, $\{F_0, \ldots, F_m\}$ immediately adjacent to a right side of the co-located PU, one or more below-neighboring blocks, $\{G_0, \ldots, G_n\}$ immediately below the co-located PU, and one below-right-neighboring block, H across from lower-right corner from the co-located PU, m and n are integers; further receiving the motion vector associated with at least one co-located block Ti,j in the co-located PU when no available motion vector in said at least one neighboring block of the co-located PU, wherein the co-located block Ti, j is selected from a co-located block group consisting of $\{T_{0, 0}, \ldots, T_{m, n}\}$, m and n are integers, $0<\text{-}i<\text{-}m$, $0<\text{-}j<\text{-}n$, $T_{i,j}=/T_{0, 0}$, and the motion vector associated with said at least one neighboring block of the co-located PU is replaced by the motion vector associated with said at least one co-located block Ti, j in the co-located PU;
  determining a MVP (motion vector predictor) or a MVP candidate based on a MVP set, wherein the MVP set comprises motion vector candidates derived from the motion vectors associated with said at least one spatially neighboring block, and said at least one neighboring block of the co-located PU; and
  applying predictive encoding or decoding to the current PU based on the MVP or the MVP candidate.

2. The method of claim 1, wherein the motion vectors associated with the spatially neighboring block and the neighboring block of the co-located PU are obtained from a previously coded frame or picture.

3. The method of claim 1, wherein each of the motion vectors associated with the spatially neighboring block and the neighboring block of the co-located PU is derived from one of multiple reference pictures and one of two lists with a scaling factor.

4. The method of claim 1, wherein the MVP set further comprises a temporal motion vector candidate derived from the motion vector associated with a co-located block corresponding to an upper-left block of a central point of the co-located PU.

5. The method of claim 1, wherein the MVP set further comprises a temporal motion vector candidate derived from the motion vector associated with a co-located block corresponding to a lower-right block of a central point of the co-located PU.

6. The method of claim 1, wherein the MVP set further comprises a temporal motion vector candidate derived from the motion vector associated with a co-located block corresponding to a lower-right block of the co-located PU.

7. The method of claim 1, wherein the MVP set further comprises a temporal motion vector candidate derived from the motion vector associated with a co-located block corresponding to an upper-left block of the below-right-neighboring block.

8. The method of claim 1, wherein a motion vector candidate in the MVP set is derived as a first available motion vector from a candidate group, wherein the candidate group consists of at least two of the motion vectors associated with at least one co-located block of the current PU and said at least one neighboring block of the co-located PU.

9. The method of claim 1, wherein a motion vector candidate in the MVP set is derived according to an order from a candidate group, wherein the candidate group consists of at least two of the motion vectors associated with at least one co-located block of the current PU and said at least one neighboring block of the co-located PU.

10. The method of claim 1, wherein information related to the MVP or the MVP candidate is incorporated in sequence header, picture header or slice header.

11. The method of claim 1, wherein information related to the MVP or the MVP candidate is derived from decoded video data.

12. An apparatus for deriving motion vector predictor or motion vector predictor candidate for encoding or decoding a motion vector of a current PU (prediction unit) in a picture, the apparatus comprising:
  one or more electronic circuits, wherein said one or more circuits are configured to
  receive a current motion vector or a current motion vector difference of the current PU;
  receive motion vectors associated with at least one spatially neighboring block of the current PU and at least one neighboring block of a co-located PU of the current block, wherein said at least one neighboring block of the co-located PU is selected from a group consisting of one or more right-neighboring blocks immediately adjacent to a right side of the co-located PU, one or more below-neighboring blocks immediately below the co-located PU, and one below-right-neighboring block immediately across from lower-right corner from the co-located PU; further receiving the motion vector associated with at least one co-located block Ti,j in the co-located PU when no available motion vector in said at least one neighboring block of the co-located PU, wherein the co-located block Ti, j is selected from a co-located block group consisting of {To, o, . . . , Tm, n}, m and n are integers, 0<–i<–m, 0<–j<–n, Ti,j≠To, o, and the motion vector associated with said at least one neighboring block of the co-located PU is replaced by the motion vector associated with said at least one co-located block Ti, j in the co-located PU;

determine a MVP (motion vector predictor) or a MVP candidate based on a MVP set, wherein the MVP set comprises motion vector candidates derived from the motion vectors associated with said at least one spatially neighboring block of the current PU and said at least one neighboring block of the co-located PU; and apply predictive encoding or decoding to the current PU based on the MVP or the MVP candidate.

13. The apparatus of claim 12, wherein the motion vectors associated with the spatially neighboring block and the neighboring block of the co-located PU are obtained from a previously coded frame or picture.

14. The apparatus of claim 12, wherein each of the motion vectors associated with the spatially neighboring block and the neighboring block of the co-located PU is derived from one of multiple reference pictures and one of two lists with a scaling factor.

15. The apparatus of claim 12, wherein the MVP set further comprises a temporal motion vector candidate derived from the motion vector associated with a co-located block corresponding to an upper-left block of a central point of the co-located PU.

16. The apparatus of claim 12, wherein the MVP set further comprises a temporal motion vector candidate derived from the motion vector associated with a co-located block corresponding to a lower-right block of a central point of the co-located PU.

17. The apparatus of claim 12, wherein the MVP set further comprises a temporal motion vector candidate derived from the motion vector associated with a co-located block corresponding to a lower-right block of the co-located PU.

18. The apparatus of claim 12, wherein the MVP set further comprises a temporal motion vector candidate derived from the motion vector associated with a co-located block corresponding to an upper-left block of the below-right-neighboring block.

19. The apparatus of claim 12, wherein a motion vector candidate in the MVP set is derived as a first available motion vector from a candidate group, wherein the candidate group consists of at least two of the motion vectors associated with at least one co-located block of the current PU and said at least one neighboring block of the co-located PU.

20. The apparatus of claim 12, wherein a motion vector candidate in the MVP set is derived according to an order from a candidate group, wherein the candidate group consists of at least two of the motion vectors associated with at least one co-located block of the current PU and said at least one neighboring block of the co-located PU.

21. The apparatus of claim 12, wherein information related to the MVP or the MVP candidate is incorporated in sequence header, picture header or slice header.

22. The apparatus of claim 12, wherein information related to the MVP or the MVP candidate is derived from decoded video data.

23. A method of deriving motion vector predictor or motion vector predictor candidate for encoding or decoding a motion vector of a current prediction unit (PU) in a picture, the method comprising:

receiving a current motion vector or a coded motion vector of the current PU;

receiving motion vectors associated with at least one spatially neighboring block of the current PU and at least one co-located block $T_{i,j}$ in a co-located PU of the current PU, wherein the co-located block $T_{i,j}$ is selected from a co-located block group consisting of $\{T_{0,0}, \ldots, T_{m,n}\}$, m and n are integers, $0 \leq i \leq m$, and $0 \leq j \leq n$;

determining a motion vector predictor (MVP) or a MVP candidate based on a MVP set, wherein the MVP set comprises motion vector candidates derived from the motion vectors associated with said at least one spatially neighboring block and said at least one co-located block $T_{i,j}$, wherein said at least one co-located block $T_{i,j}$ excludes $T_{0,0}$; and applying predictive encoding or decoding to the current PU based on the MVP or the MVP candidate.

24. The method of claim 23, wherein the MVP set comprises a temporal motion vector candidate derived from the motion vector associated with one co-located block corresponding to a lower-right block of a central point of the co-located PU.

* * * * *

UNITED STATES PATENT AND TRADEMARK OFFICE
CERTIFICATE OF CORRECTION

PATENT NO. : 8,711,940 B2  
APPLICATION NO. : 13/089233  
DATED : April 29, 2014  
INVENTOR(S) : Lin et al.

Page 1 of 1

It is certified that error appears in the above-identified patent and that said Letters Patent is hereby corrected as shown below:

In the claims

In col. 9, lines 62-63, please delete "$0<-i<-m, 0<-j<-n, T_{i,j} =/ T_{o,o}$" and insert --$0 \leq i \leq m, 0 \leq j \leq n, T_{i,j} \neq T_{o,o}$--.

In col. 11, line 12, please delete "$0<-i<-m, 0<-j<-n, T_{i,j} =/ T_{o,o}$" and insert --$0 \leq i \leq m, 0 \leq j \leq n, T_{i,j} \neq T_{o,o}$--.

Signed and Sealed this  
Twenty-first Day of June, 2016

Michelle K. Lee  
*Director of the United States Patent and Trademark Office*